United States Patent
Pearson et al.

(10) Patent No.: US 8,194,744 B2
(45) Date of Patent: Jun. 5, 2012

(54) METHOD AND/OR APPARATUS FOR IMPLEMENTING REDUCED BANDWIDTH HIGH PERFORMANCE VC1 INTENSITY COMPENSATION

(75) Inventors: Eric C. Pearson, Conestogo (CA); Anthony Peter Joch, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1659 days.

(21) Appl. No.: 11/524,125

(22) Filed: Sep. 20, 2006

(65) Prior Publication Data
US 2008/0069219 A1    Mar. 20, 2008

(51) Int. Cl.
*H04N 7/12* (2006.01)
(52) U.S. Cl. .............. 375/240.16; 375/240.25
(58) Field of Classification Search ............ 375/240, 375/240.01, 240.12, 240.16, 240.25
See application file for complete search history.

(56) References Cited

U.S. PATENT DOCUMENTS

| 5,870,146 A | 2/1999 | Zhu | 178/405 |
| 7,916,796 B2 * | 3/2011 | Yan | 375/240.27 |
| 2005/0232497 A1 | 10/2005 | Yogeshwar et al. | 382/232 |
| 2007/0036219 A1 * | 2/2007 | Choi et al. | 375/240.16 |

* cited by examiner

*Primary Examiner* — Allen Wong
(74) *Attorney, Agent, or Firm* — Christopher P. Maiorana, PC

(57) ABSTRACT

An apparatus comprising a first circuit, a second circuit and a third circuit is disclosed. The first circuit may be configured to generate an output signal and one or more motion vectors in response to (i) a bitstream signal and (ii) a predictor signal. The second circuit may be configured to generate one or more reference data pixels in response to an address signal and the output signal. The third circuit may be configured to generate the predictor signal and address signal in response to (i) the motion vectors and (ii) the reference data pixels.

20 Claims, 6 Drawing Sheets

US 8,194,744 B2

METHOD AND/OR APPARATUS FOR IMPLEMENTING REDUCED BANDWIDTH HIGH PERFORMANCE VC1 INTENSITY COMPENSATION

FIELD OF THE INVENTION

The present invention relates to digital video generally and, more particularly, to a method and/or apparatus for implementing reduced bandwidth, high performance, VC1 intensity compensation.

BACKGROUND OF THE INVENTION

The VC1 video standard (i.e., as defined by SMPTE 421M) includes intensity compensation on frames before motion compensation occurs. The intensity compensation is defined to occur in place (i.e., stored back into the same memory buffer) Subsequent references to the same frame using intensity compensation apply the new intensity compensation to the results of the previous intensity compensation. FIG. 1 shows a conventional system where the flow and structure for decoding of VC1 inter macroblocks is implemented without intensity compensation. FIG. 2 shows a conventional system with the addition of intensity compensation.

One conventional approach for intensity compensation is provided by the VC1 reference software. The pre-intensity compensation (i.e., multiply, add, scale, and clip) is applied to an entire reference frame before motion compensation. In a software implementation, which is typically implemented in a computer bound by predetermined multiples, the overall number of multiply operations are reduced as motion compensation input data includes extra pixels for interpolation.

The disadvantages of such a system includes issues such as that during intensity compensation, no other task can be implemented simultaneously. Such an implementation wastes dedicated resources if a hardware implementation is used. The bandwidth of the intensity compensation (read and write) also adds to the overall memory bandwidth.

It would be desirable to implement a real time intensity compensation system that allows motion compensation to occur simultaneously with intensity compensation.

SUMMARY OF THE INVENTION

The present invention concerns an apparatus comprising a first circuit, a second circuit and a third circuit. The first circuit may be configured to generate an output signal and one or more motion vectors in response to (i) a bitstream signal and (ii) a predictor signal. The second circuit may be configured to generate one or more reference data pixels in response to an address signal and the output signal. The third circuit may be configured to generate the predictor signal and the address signal in response to (i) the motion vectors and (ii) the reference data pixels. The apparatus is generally configured to provide motion compensation and intensity compensation simultaneously.

The objects, features and advantages of the present invention include providing an intensity compensation system that may (i) be useful in a VC1 system, (ii) save memory bandwidth since intensity compensation is not performed as a separate step, but rather implemented during the motion compensation memory reads (e.g., zero additional bandwidth needed for intensity compensation), and/or (iii) save time (e.g., improved efficiency, and corresponding area savings) by allowing motion compensation to occur at the same time as intensity compensation.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
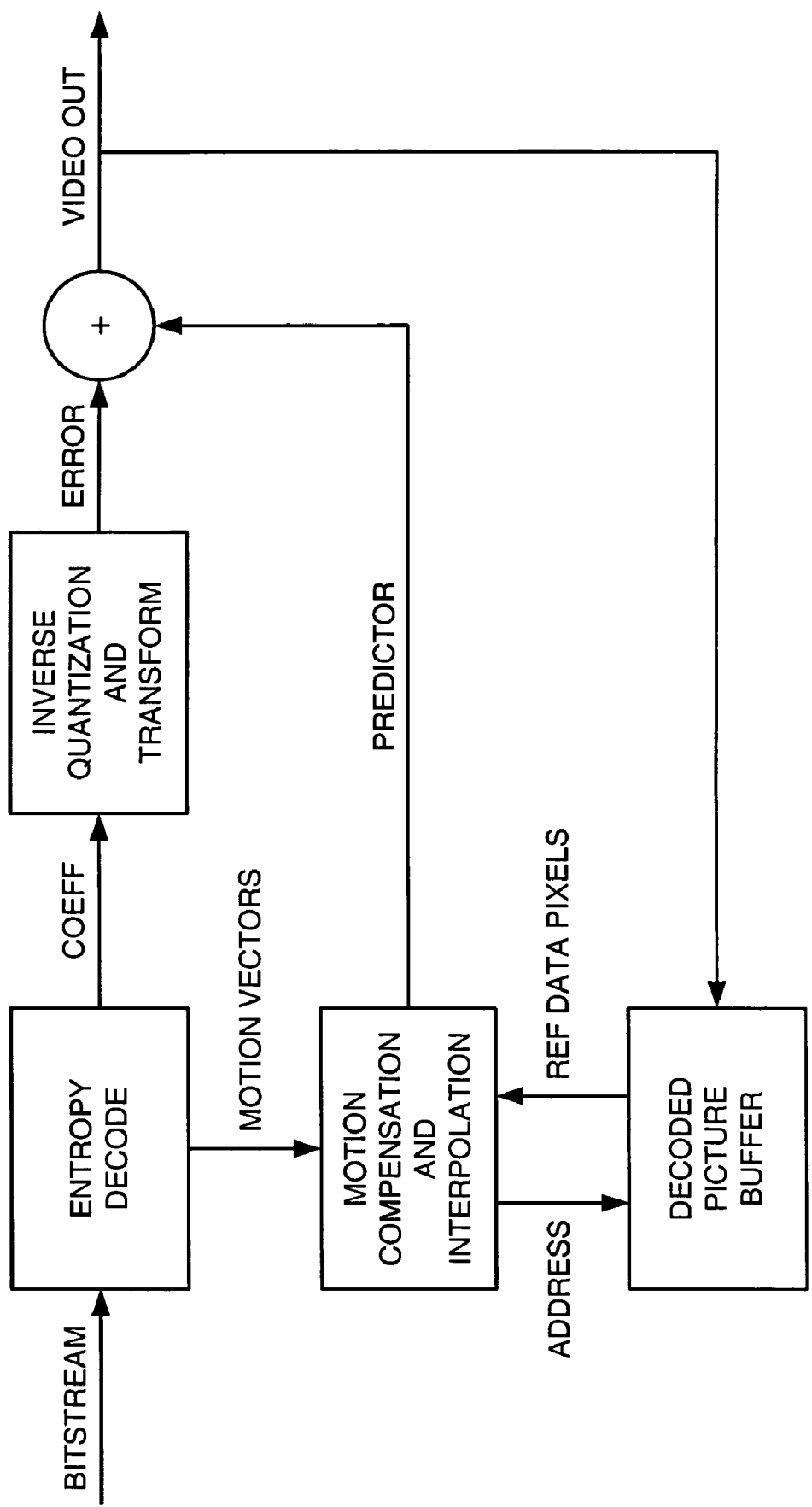
FIG. 1 is a block diagram of a conventional system for decoding VC1 inter macroblocks without intensity compensation.
Figure 2:
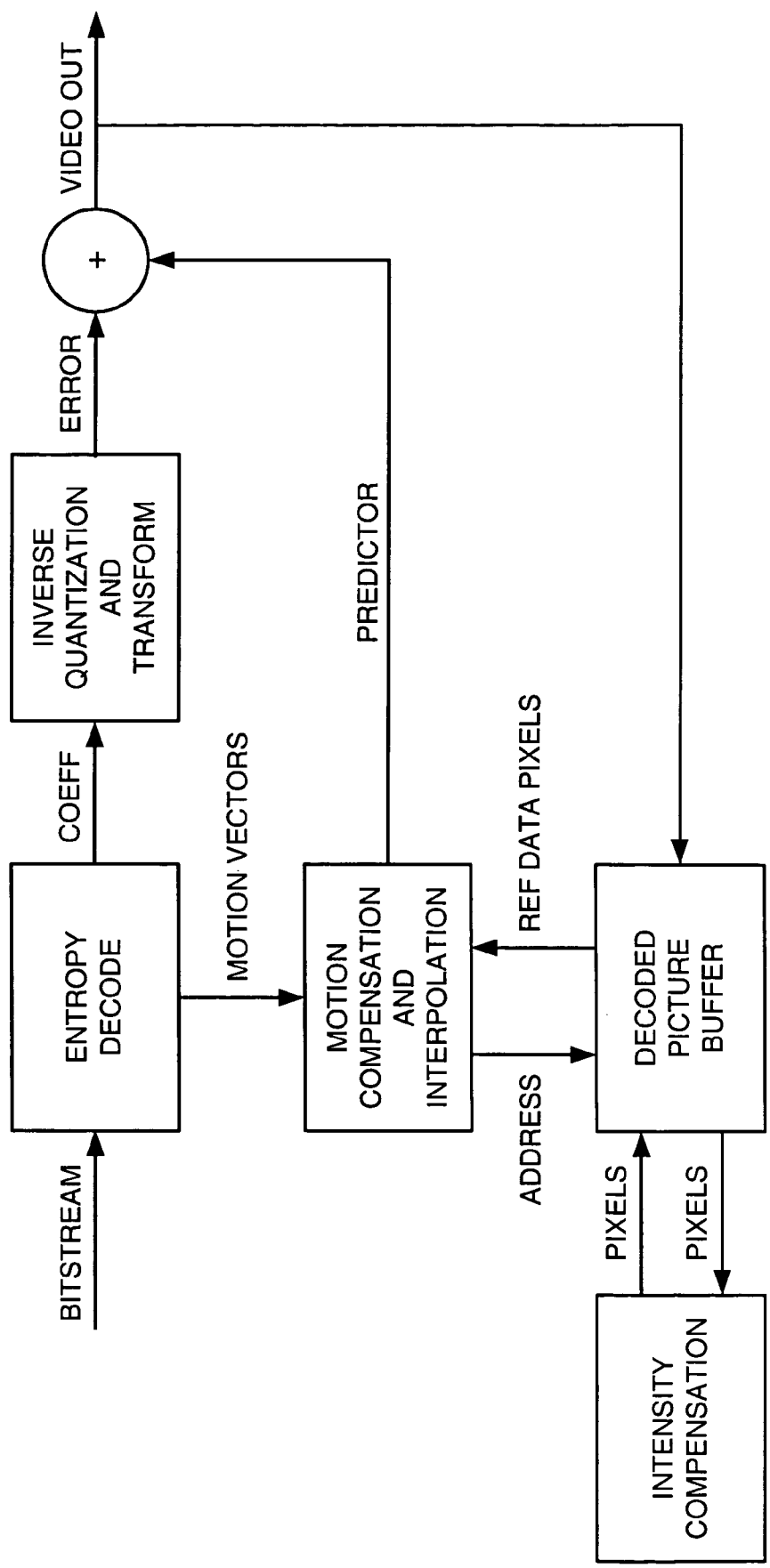
FIG. 2 is a block diagram of a conventional system with intensity compensation.
Figure 3:
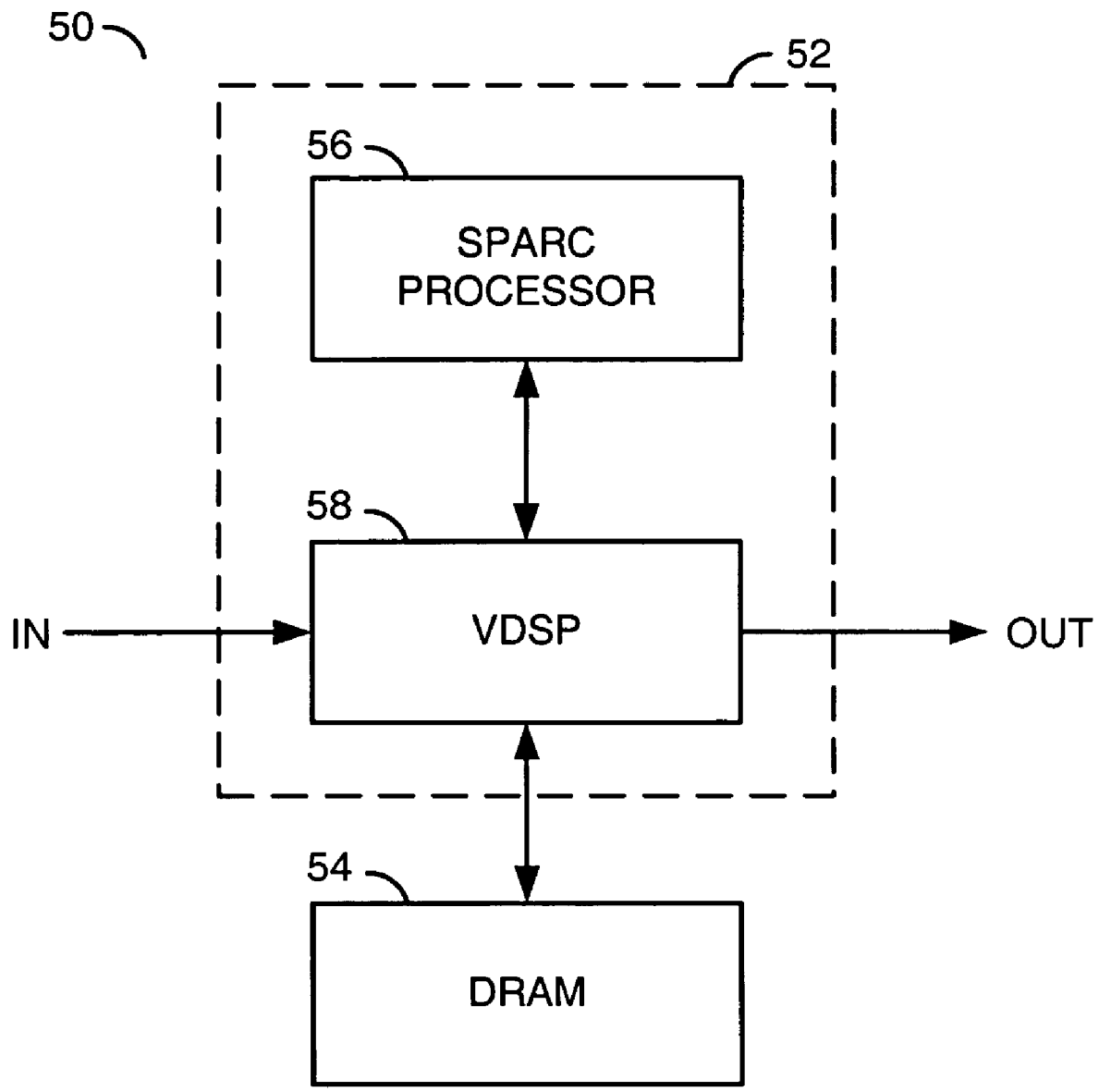
FIG. 3 is a block diagram of a system incorporating the present invention.

Referring to FIG. 3, a block diagram of a system 50 incorporating the present invention is shown. The system (or circuit) 50 may be implemented as a video transcoder. The video transcoder 50 generally comprises a module (or circuit) 52 and a memory 54. The module 52 generally comprises a processor (or circuit) 56 and a processor (or circuit) 58. The processor 58 may be directly coupled to the processor module 56 and the memory 54. The memory 54 may be implemented within the module 52 or externally to the module 52. A signal (e.g., IN) may be received by the processor module 58. The signal IN may be an uncompressed digital bitstream. A signal (e.g., OUT) may be presented by the processor module 58. The signal OUT may be an uncompressed video signal.

The processor module 56 may be implemented as a SPARC processor. The processor 56 may be operational to perform portions of the decoding operations and the encoding operations in software. The processor 56 may also be operational to control the processor module 58. While a SPARC processor is show, other types of processors may be implemented to meet the criteria of a particular application.

The processor module 58 may be implemented as a video digital signal processor (VDSP). The VDSP module 56 may be operational to perform portions of the decoding operations and portions of the encoding operations in hardware. The VDSP module 58 may be controlled by the processor 56.

The memory 54 may be implemented as a dynamic random access memory (DRAM). The memory 54 may be operational to store or buffer information consumed and generated by the decoding operations and the encoding operations of the system 50. In one example, the memory 54 may be implemented as a double data rate (DDR) memory. However, other memory technologies may be implemented to meet the criteria of a particular application.

Figure 4:
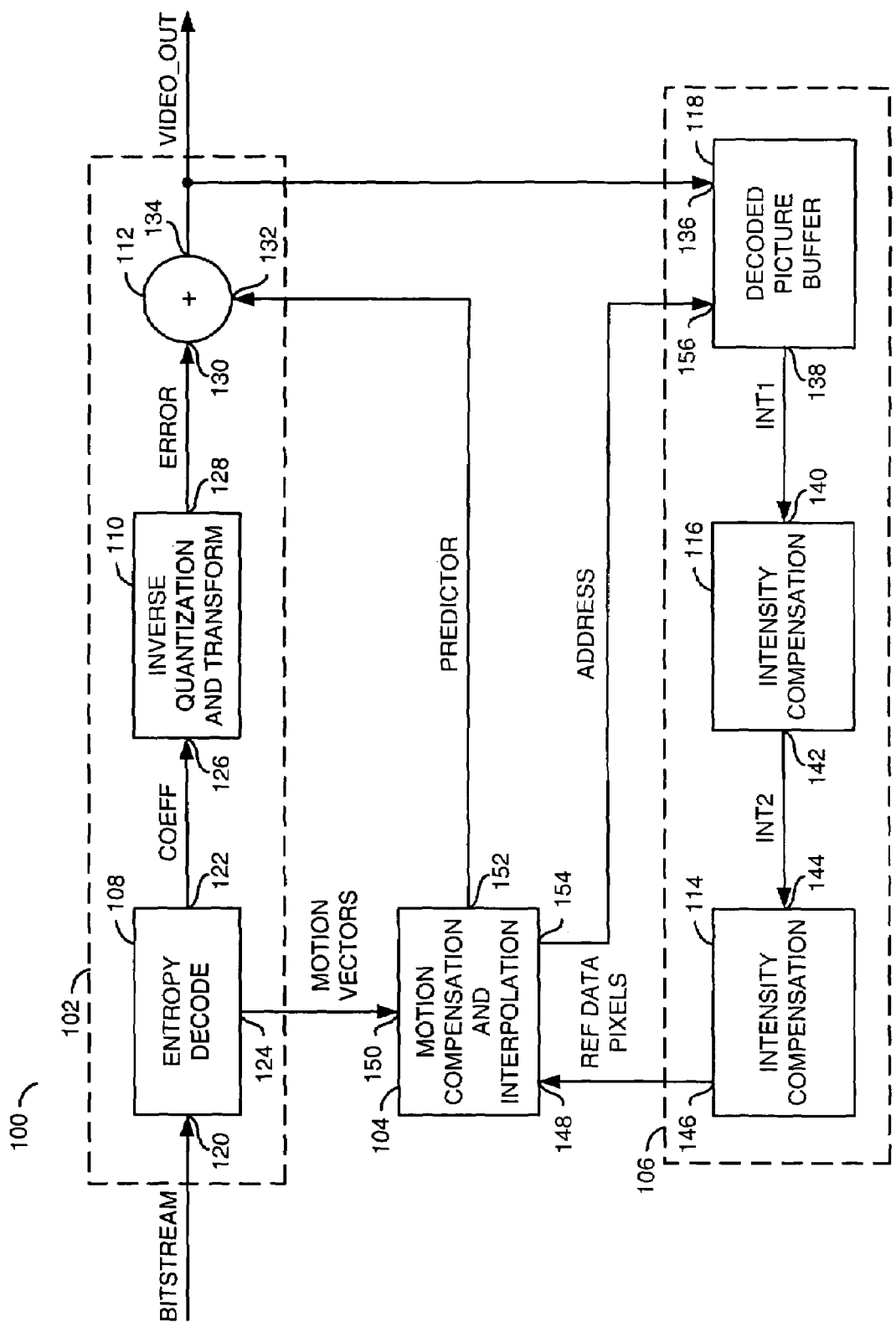
FIG. 4 is a block diagram of an embodiment of the present invention using intensity compensation.

Referring to FIG. 4, a block diagram of a system 100 is shown in accordance with a preferred embodiment of the present invention. The system 100 generally provides intensity compensation. The system 100 typically operates within the processor 58. The signal IN from FIG. 3 is shown as a signal (e.g., BITSTREAM). The signal OUT from FIG. 3 is shown as a signal (e.g., VIDEO_OUT). The system 100 generally comprises a block (or circuit) 102, a block (or circuit) 104, a block (or circuit) 106. The circuit 102 generally comprises a block (or circuit) 108, a block (or circuit) 110, and a block (or circuit) 112. The circuit 106 generally comprises a block (or circuit) 114, a block (or circuit) 116 and a block (or circuit) 118. The block 108 may be implemented as an entropy decode circuit. The block 110 may be implemented as an inverse quantization and transform circuit. The block 112 may be implemented as an adder circuit. The block 118 may be implemented as a decode picture buffer circuit. The block 114 may be implemented as an intensity compensation circuit. The block 116 may also be implemented as an intensity compensation circuit. The block 104 may be implemented as a motion compensation and interpolation circuit.

The circuit 108 may have an input 120 that may receive the signal BITSTREAM, an output 122 that may present a signal (e.g., COEFF) and an output 124 that may present a signal (e.g., MOTION_VECTORS). The block 110 may have an input 126 that may receive the signal COEFF and an output 128 that may present a signal (e.g., ERROR). The signal COEFF may be a coefficient signal. The summing block 112 may have an input 130 that may receive the signal ERROR, an input 132 that may receive a signal (e.g., PREDICTOR) and an output 134 that may present the signal VIDEO_OUT. The block 118 may have an input 136 that may receive the signal VIDEO_OUT, an input 156 that may receive a signal (e.g., ADDRESS) and an output 138 that present a signal (e.g., INT1). The block 116 may have an input 140 that may receive the signal INT1 and an output 142 that may present a signal (e.g., INT2). The circuit 114 may have an input 144 that may receive the signal INT2 and an output 146 that may present a signal (e.g., REF_DATA_PIXELS). The signal INT1 and INT2 may be intermediate signals. The block 104 may have an input 148 that may receive the signal REF_DATA_PIXELS, an input 150 that may receive the signal MOTION_VECTORS, an output 154 that may present the signal ADDRESS and an output 152 that may present the signal PREDICTOR.

The motion compensation block 104 normally generates the signal ADDRESS in response to the motion vectors received from the input 150. The signal ADDRESS contains the information to needed to read a rectangle of pixel of data from the decoded picture buffer 118. The signal ADDRESS, in one example, comprises a base address, width, height, and image pitch (e.g., distance in bytes between 2 vertically adjacent pixels). Alternatively, the signal ADDRESS may be a stream of addresses corresponding to memory words or pixels, that when taken together describe the rectangle of pixels used for motion compensation.

For a real time, hardware implementation, the circuit 100 may be used to save intensity compensation bandwidth. The circuit 100 may also allow motion compensation to occur at the same time as intensity compensation by employing front end intensity compensation scaling operations on the input data presented to the motion compensation block 104. In general, one or two independent stages of intensity compensation 114 and 116 may be needed. In certain implementations, a single stage of intensity compensation (e.g., the circuit 114) may be implemented. In other implementations, the intensity compensation circuits 114 and 116 may be combined.

Figure 5:
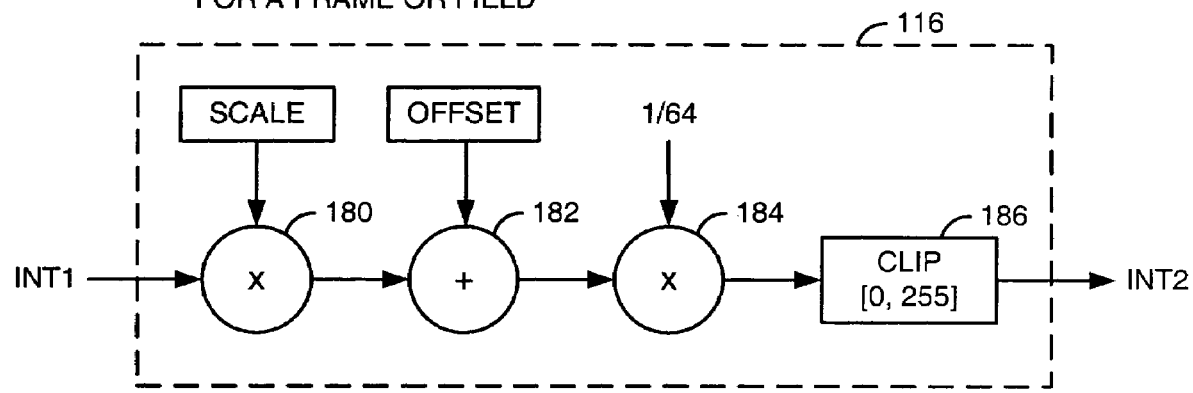
FIG. 5 is a diagram illustrating the flow and structure for intensity compensation of a single pixel.

Referring to FIG. 5, a diagram illustrating the intensity compensation circuit 116 operating on a single pixel is shown. The intensity compensation circuit 116 generally comprises a block (or circuit) 180, a block (or circuit) 182, a block (or circuit) 184 and a block (or circuit) 186. The block 180 and the block 184 may be implemented as multiply circuits. The block 182 may be implemented as an adder circuit. The block 180 may multiply the signal INT1 by a signal (e.g., SCALE). The block 182 may add a signal (e.g., OFFSET) to the result received from the block 180. The block 184 may multiply the result received from the block by a signal (e.g., $1/64$). The circuit 186 may be implemented as a clip circuit. The clip circuit may limit the amplitude of the signal received from the block 184 to a fixed amount. In the example shown, the fixed amount may be between 0 and 255. The clip circuit then presents the output signal INT2.

The intensity compensation circuit 116 may be duplicated in parallel as needed (to be described in more detail in connection with FIG. 6). A parallel configuration may be used to provide the desired processing without reducing the data rate. In a hardware implementation, the intensity compensated pixels need to be constricted to fit within packets typically read via a memory bus connected to the reference pad buffer 118. To provide the desired bus width, the intensity compensation block 116 may be replicated to match the bandwidth of the bus. In the preferred implementation, such a bus is normally 64-bits, or 8 pixels. In such an example, the intensity compensation unit 116 may be replicated 8 times for each of 2 intensity compensation stages. While an 8 pixel example has been described, other pixel widths may be implemented to meet the design criteria of a particular implementation.

The signal SCALE and the signal OFFSET are numbers that may be derived from the VC1 picture bitstream syntax elements LUMSCALE and LUMSHIFT. The elements LUMSCALE and LIMSHIFT are typically represented as 6-bit values. The element LUMSCALE is typically an unsigned value ranging from 0 to 63. The element LUMSHIFT is typically a signed value ranging from −32 to 31. The following script describes an example of operation of the intensity compensation circuit 116:

```
if( LUMSCALE == 0)
    Scale = −64
    OFFSET = 255 * 64 − LUMSHIFT * 2 * 64
else
    SCALE = LUMSCALE + 32
    OFFSET = LUMSHIFT * 64
endif
out = ( Scale * in + Offset + 32 ) >> 6
```

The value $1/64$ when multiplied with another signal A, produces an output signal A/64, with rounding to the nearest integer. Since this is a power of 2, this is also equivalently (A+32)>>6, where >>6 indicates an binary arithmetic right shift of 6 bits. The present invention normally provides intensity compensation operations that may be performed on most (or all) of the pixels based on 2 different sets of LUMSCALE and LUMSHIFT extracted from 2 different pictures.

Figure 6:
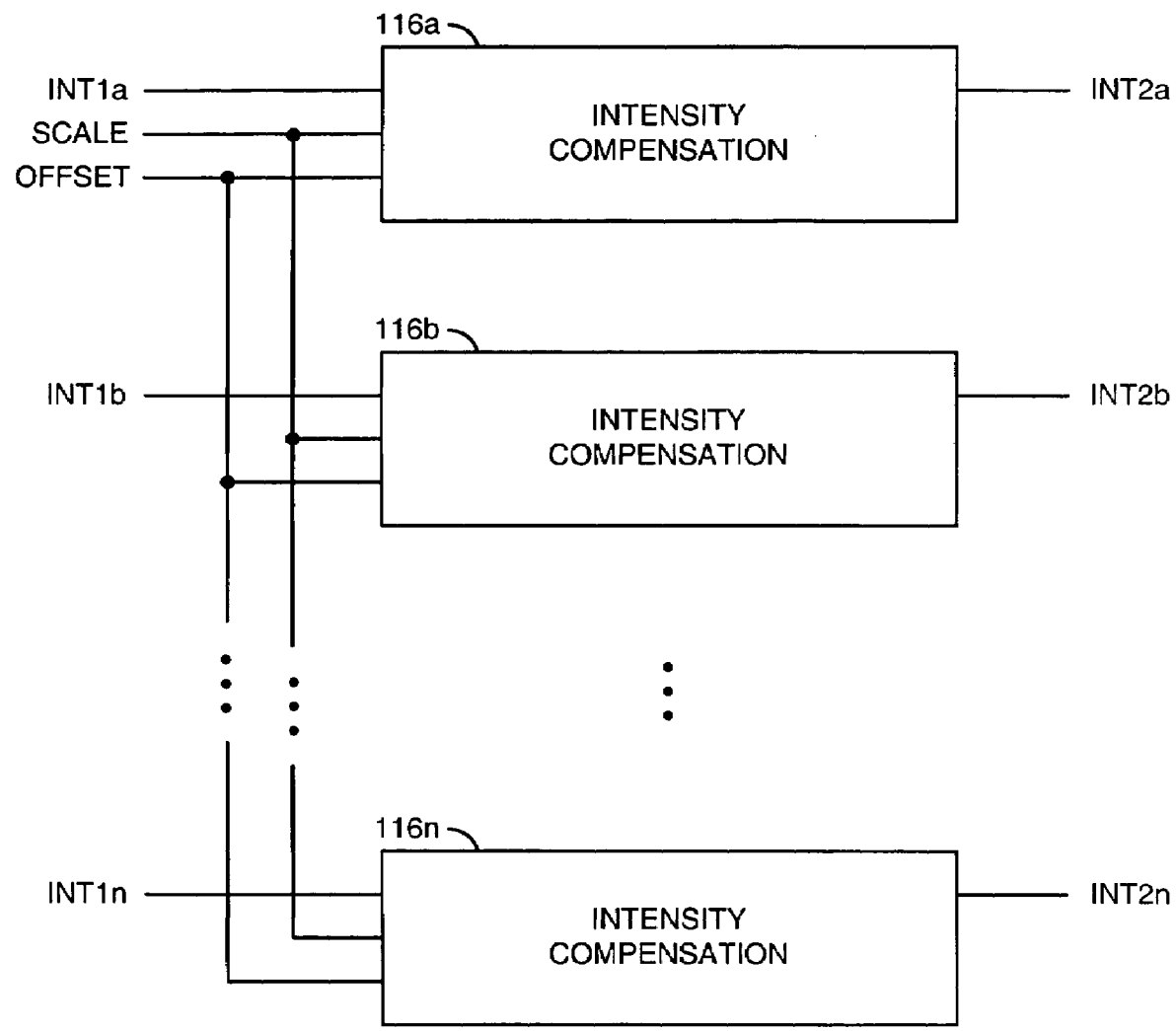
FIG. 6 is a diagram illustrating intensity compensation for a number of pixels.

Referring to FIG. 6, a diagram illustrating the operation of a number of intensity circuits 116a-116n is shown operating on multiple bits. Each of the intensity compensation circuit 116a-116n generally include the individual elements described in FIG. 5. A first pixel (e.g., INT1a) is shown presented to the intensity compensation circuit 116a. The intensity compensation circuit 116b generally receives a second pixel (e.g., INT1b). Similarly, the intensity compensation circuit 116n generally receives the last pixel (e.g., INT1n). The intensity compensation circuits 116a-116n normally present a respective pixel at one of a number of outputs (e.g., INT2a-INT2n).

In an alternate example, the intensity compensation circuits 114 and 116 may be implemented on the front end of a motion compensation unit (e.g., within the processor 56). In another example, the intensity compensation circuits 114 and 116 may be included in a read logic portion of the memory 54. The memory 54 may also be implemented as a memory sub-system in an example that implements a logically similar implementation. While a decoder has been show, a similar process may be performed to improve the performance of a VC1 encoder (where essentially identical operations are performed).

Detection of the use of the present invention may be fairly simple. In general, the minimum bandwidth for a processor decoding a known VC1 bitstream is a known parameter. Bitstreams with and without intensity compensation may be generated. The present invention may be implemented without increasing memory bandwidth usage for streams with and without intensity compensation. By observing the memory configuration from the devices published data sheet, the maximum system bandwidth may be calculated. Such a calculation should be sufficient to infer the use of the present invention since the bandwidth usage of a tested device may be measured with the 2 bitstreams above.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

Additionally, inverters may be added to change a particular polarity of the signals. As used herein, the term "simultaneously" is meant to describe events that share some common time period but the term is not meant to be limited to events that begin at the same point in time, end at the same point in time, or have the same duration.

The system represented by the circuit 100 may be implemented in hardware, software or a combination of hardware and software according to the teachings of the present disclosure, as would be apparent to those skilled in the relevant art(s).

While the invention has been particularly shown and described with reference to the preferred embodiments thereof, it will be understood by those skilled in the art that various changes in form and details may be made without departing from the scope of the invention.

The invention claimed is:

1. An apparatus comprising:
a first circuit configured to generate an output signal and one or more motion vectors in response to (i) a bitstream signal and (ii) a predictor signal;
a second circuit configured to generate a sequence of data packets on a bus in response to (i) an address signal and (ii) said output signal, wherein each of said of said packets contains a plurality of reference data pixels; and
a third circuit configured to (i) receive said packets via said bus and (ii) generate said predictor signal and said address signal by a motion compensation of said reference data pixels received from said bus in response to said motion vectors, wherein (i) said apparatus provides said motion compensation simultaneously with a plurality of intensity compensations of said reference data pixels and (ii) said intensity compensations are performed in parallel on said reference data pixels in each of said packets.

2. The apparatus according to claim 1, wherein said third circuit comprises a plurality of first intensity compensation circuits operating in parallel.

3. The apparatus according to claim 2, wherein said third circuit further comprises a plurality of second intensity compensation circuits operating in parallel.

4. The apparatus according to claim 1, wherein bitstream signal comprises a compressed bitstream.

5. The apparatus according to claim 1, wherein said output signal comprises an uncompressed video signal.

6. The apparatus according to claim 1, wherein said first circuit further comprises:

an entropy circuit configured to generate (i) said motion vectors and (ii) a coefficient signal, in response to said bitstream signal;
a transform circuit configured to generate an error signal in response to said coefficient signal; and
an adder circuit configured to generate said output signal in response to (i) said error signal and (ii) said predictor signal.

7. The apparatus according to claim 6, wherein said transform circuit comprises an inverse quantization and transform circuit.

8. The apparatus according to claim 7, wherein said third circuit comprises a motion compensation and interpolation circuit.

9. The apparatus according to claim 1, wherein said apparatus implements said intensity compensation without using more bandwidth on said bus than needed to implement said motion compensation.

10. The apparatus according to claim 1, wherein said apparatus is implemented in a VC1 system.

11. The apparatus according to claim 1, wherein said second circuit comprises a plurality of intensity compensation circuits configured to generate said packets on said bus.

12. The apparatus according to claim 11, wherein a data width of said bus matches a product of a number of said intensity compensation circuits and a bit width of said reference data pixels.

13. An apparatus comprising:
means for generating an output signal and one or more motion vectors in response to (i) a bitstream signal and (ii) a predictor signal;
means for generating a sequence of data packets on a bus in response to (i) an address signal and (ii) said output signal, wherein each of said of said packets contains a plurality of reference data pixels;
means for receiving said packets via said bus; and
means for generating said predictor signal and said address signal by a motion compensation of said reference data pixels received from said bus in response to said motion vectors, wherein (i) said apparatus provides said motion compensation simultaneously with a plurality of intensity compensations of said reference data pixels and (ii) said intensity compensations are performed in parallel on said reference data pixels in each of said packets.

14. A method for performing intensity compensation comprising the steps of:
(A) generating an output signal and one or more motion vectors in response to (i) a bitstream signal and (ii) a predictor signal;
(B) generating a sequence of data packets on a bus in response to (i) and address signal and (ii) said output signal, wherein each of said of said packets contains a plurality of reference data pixels;
(C) receiving said packets via said bus; and
(D) generating said predictor signal and said address signal by a motion compensation of said reference data pixels received from said bus in response to said motion vectors, wherein (i) said method provides said motion compensation simultaneously with a plurality of intensity compensations of said reference data pixels and (ii) said intensity compensations are performed in parallel on said reference data pixels in each of said packets.

15. The method according to claim 14, wherein step (D) uses a plurality of first intensity compensation circuits operating in parallel.

16. The method according to claim 15, wherein step (D) further uses a plurality of second intensity compensation circuits operating in parallel.

17. The method according to claim 14, wherein bitstream signal comprises a compressed bitstream.

18. The method according to claim 14, wherein said output signal comprises an uncompressed video signal.

19. The method according to claim 14, wherein said intensity compensations are implemented in a plurality of intensity compensation circuits configured to generate said packets on said bus.

20. The method according to claim 19, wherein a data width of said bus matches a product of a number of said intensity compensation circuits and a bit width of said reference data pixels.

* * * * *